United States Patent [19]
Bartelt et al.

[11] Patent Number: 5,563,346
[45] Date of Patent: Oct. 8, 1996

[54] METHOD AND DEVICE FOR IMAGING AN OBJECT USING A TWO-DIMENSIONAL ULTRASONIC ARRAY

[75] Inventors: Hartmut Bartelt; Ekkert Bartosch; Peter Kraemmer, all of Erlangen, Germany

[73] Assignee: Siemens Aktiengesellschaft, München, Germany

[21] Appl. No.: 390,839

[22] Filed: Feb. 17, 1995

[30] Foreign Application Priority Data

Feb. 21, 1994 [DE] Germany ............................ 44 05 504.8

[51] Int. Cl.⁶ .................................................. G01N 29/26
[52] U.S. Cl. ........................ 73/626; 73/625; 128/661.01
[58] Field of Search ............................ 73/626, 625, 628; 128/661.01, 660.07, 661.1

[56] References Cited

U.S. PATENT DOCUMENTS

| | | | |
|---|---|---|---|
| 4,005,382 | 1/1977 | Beaver | 73/626 |
| 4,159,462 | 6/1979 | Rocha et al. | 73/626 |
| 4,219,846 | 8/1980 | Auphan | 358/112 |
| 4,242,912 | 1/1981 | Burckhardt et al. | 73/626 |
| 4,412,316 | 10/1983 | Diepers | 367/105 |
| 4,448,075 | 5/1984 | Takemura et al. | 73/626 |
| 4,576,045 | 3/1986 | Miller-Jones | 73/626 |
| 4,608,868 | 9/1986 | Green | 73/606 |
| 5,060,651 | 10/1991 | Kondo et al. | 73/626 |
| 5,186,175 | 2/1993 | Hirama et al. | 128/661.01 |
| 5,485,843 | 1/1996 | Greenstein et al. | 128/661.09 |

FOREIGN PATENT DOCUMENTS

0430450A2  6/1991  European Pat. Off. .

OTHER PUBLICATIONS

Turnbull et al., "Beam Steering with Pulsed Two-Dimensional Transducer Arrays," *IEEE Transactions on Ultrasonics, Ferroelectrics and Frequency Control*, vol. 38, No. 4, pp. 320–333 (Jul. 1991).

Smith et al., "High-Speed Ultrasound Volumetric Imaging System—Part I: Transducer Design and Beam Steering," *IEEE Transactions on Ultrasonics, Ferroelectrics and Frequency Control*, vol. 38, No. 2, pp. 100–108 (Mar. 1991).

van Ramm et al., "High Speed Ultrasound Volumetric Imaging System—Part II: Parallel Processing and Image Display," *IEEE Transactions on Ultrasonics, Ferroelectrics and Frequency Control*, vol. 38, No. 2, pp. 100–115 (Mar. 1991).

*Primary Examiner*—Hezron E. Williams
*Assistant Examiner*—Nashmiya Ashraf
*Attorney, Agent, or Firm*—Kenyon & Kenyon

[57] ABSTRACT

A method and a device for imaging an object using ultrasound. Transducer elements of a two-dimensional array are interconnected to form sub-arrays. The transducer elements of each sub-array are driven in the transmit mode with the same time delay and read out jointly in the receive mode. In this manner, the number of required time delays is reduced, and parasitic capacitances on the signal lines are diminished.

11 Claims, 6 Drawing Sheets

METHOD AND DEVICE FOR IMAGING AN OBJECT USING A TWO-DIMENSIONAL ULTRASONIC ARRAY

BACKGROUND OF THE INVENTION

The present invention relates to a method and a device for imaging an object using a two-dimensional array of ultrasonic transducer elements. Such a method and such a device are discussed in German Patent No. DE-28 41 694 C3 and the corresponding U.S. Pat. No. 4,219,846, for example.

In ultrasound diagnostic medicine and during nondestructive ultrasonic testing of workpieces, a volumetric area of the object to be imaged is irradiated by ultrasonic pulses in a transmit mode. A signal-processing unit in a main unit receives reflected ultrasonic echo pulses, constructs an ultrasonic image corresponding to a two-dimensional (2-D) cross-section through the object based on the received echo pulses, and displays the constructed ultrasonic image on a monitor.

Under the state of the art, one-dimensional (1-D) phased arrays transmit and receive ultrasonic pulses. These arrays include piezoelectric transducer elements driven by an electronic control unit with selected time delays (often described as phase lags). Such arrays, driven with time delay, permit steered (or "swiveled" or "pivoted") ultrasonic beams to be transmitted and received and permit the ultrasonic beams to be focused in a plane which is fixed relative to the normal to the array surface and which is fixed relative to the longitudinal direction of the array.

Generally, the smaller the transducer elements the larger the steering angle, measured relative to the normal, can be for the ultrasonic beam. The spacing of the transducer elements is generally selected to be approximately half the wavelength of the ultrasound to avoid additional diffraction patterns (i.e., side lobes). For example, at a diagnostic test frequency of 3.5 MHz, the spacing of the transducer elements is about 0.2 mm. On the other hand, the array must have a defined minimum length to achieve an adequate acoustic amplitude and to exactly focus the beam. From these two requirements, namely from the maximum spacing of the transducer elements and the minimum length of the array, a minimum number (typically 64) of transducer elements for the array can be determined.

In addition to one-dimensional ultrasonic arrays, prototypes of two-dimensional (2-D) transducer arrays are also known. Such two-dimensional transducer arrays are generally rectangular, circular or annular in shape. A rectangular two-dimensional array is usually constructed as an M×N-matrix of individual, generally rectangular, transducer elements. If these transducer elements are driven with properly selected time delays, then in contrast to the one-dimensional arrays in the transmit mode, an ultrasonic beam can be generated that can be steered and, in general, focused not only in one, but in two angular directions.

To scan a large enough solid-angle area with the ultrasonic beam, the conditions of a maximum spacing of typically about 0.2 mm between the transducer elements and of a minimum surface (aperture) of the 2-D array of typically about 20×20 mm$^2$ should be met for a quadratic array (i.e., an array in which N=M) and 3.5 MHz diagnostic frequency. That is, the maximum spacing requirement and minimum surface requirement of the two-dimensional array is analogous to the requirements for the one-dimensional arrays discussed above. Consequently, a minimum number of transducer elements is also required for the two-dimensional array, which can amount, for example, to 64×64=4096.

Such a large number of transducer elements and the requisite small dimensions entail problems for manufacturing and contacting (i.e., connecting) the transducer elements. The large number of control or data lines required to transmit the control signals and the video signals, as well as the parasitic capacitances on the data lines, also present problems.

In one known way for alleviating these problems, the number of transducer elements in the array is reduced in accordance with a geometric specification or statistically (See Turnbull et al., "Beam Steering with Pulsed Two-Dimensional Transducer Arrays," *IEEE Transactions on Ultrasonics, Ferroelectrics and Frequency Control*, Vol. 38, No. 4, pp. 320–333 (July 1991); See also, Smith et al., "High-Speed Ultrasound Volumetric Imaging System—Part I: Transducer Design and Beam Steering," *IEEE Transactions on Ultrasonics, Ferroelectrics and Frequency Control*, Vol. 38, No. 2, pp. 100–108 (March 1991); and van Ramm et al., "High Speed Ultrasound Volumetric Imaging System—Part II: Parallel Processing and Image Display," *IEEE Transactions on Ultrasonics, Ferroelectrics and Frequency Control*, Vol. 38, No. 2, pp. 109–115 (March 1991)). However, when these measures are used, the beam characteristic of the 2-D array will be adversely affected.

The German Patent Publication No. DE-36 90 124 T1, which corresponds to U.S. Pat. No. 4,608,868, discusses an ultrasonic imaging device including a curved transducer for producing an ultrasonic beam focused on a focusing volume.

The German Patent No. DE-30 19 409 A1, which corresponds to U.S. Pat. No. 4,412,316 ("the '316 patent"), discusses an ultrasonic transducer matrix in which the transducer elements on the two opposite facing flat sides of the matrix are different, but are interconnected in a definitively prescribed manner. On a first flat side of the matrix, parallel rows of transducer elements are each contacted by a shared control line. On the second flat side of the matrix, facing opposite to the first flat side, a transducer element in the center of the matrix, and groups of transducer elements that are arranged concentrically with respect to this transducer element in the center of the matrix, are each contacted, via a shared concentric electrode, by one shared control line. The concentric groups of transducer elements can be square, annular, or star-shaped.

In one embodiment of the '316 patent, the shared electrodes for the concentric groups of transducer elements are each connected to zero potential (ground). A time-delayed transmit pulse, having the same delay for all matrix rows, is applied to each of the matrix rows of transducer elements via the control electrodes on the first flat side of the matrix. An ultrasonic beam, which can be steered within a solid-angle area, is produced since all matrix rows are driven with a linear delay. The steering angle depends on the magnitude of the linear delay. By having a quadratic delay of the transmit pulses for the matrix rows overlap the linear delay, an ultrasonic beam that can be steered, as well as focused, is produced.

In another embodiment of the '316 patent for producing a focused ultrasonic beam, the rows of the transducer elements on the first flat side of the matrix are connected to zero potential (ground), and each of the concentric groups of transducer elements on the second flat side of the matrix are driven, via the respectively allocated shared electrode, with the same quadratic delay in the transmit mode, and are read out in the receive mode. The depth of focus of the ultrasonic beam can be controlled by varying the quadratic delay. In this second variant, steering the ultrasonic beam is not possible.

U.S. Pat. No. 5,186,175 discusses another ultrasonic imaging device having an ultrasonic transducer matrix. The transducer matrix can be electrically connected via, a switching circuit, to both transmitter and receiver electronics. The switching circuit interconnects the transducer elements of the matrix by rows or columns. These rows or columns of transducer elements are driven jointly in the transmit mode and are read out jointly in the receive mode. In this manner, the number of signal lines can be reduced to the number of transducer elements in each row or column. A special evaluation with delay elements in the receive mode (beam forming) enables the received signals to be assigned to a preselected focal point in the object being diagnosed. This known ultrasonic imaging device does not permit the ultrasonic beam to be steered within a solid angle and does not permit a dynamic focusing in two spatial directions.

German Patent No. DE-28 41 694 C3, which corresponds to U.S. Pat. No. 4,219,846, discusses an ultrasonic imaging system having a rectangular, matrix-shaped transducer array. In a selected, rectangular scanning zone, which includes a portion of the transducer elements of the array, a portion of the transducer elements are interconnected by a switch circuit to form a selected configuration of sub-arrays.

The sub-arrays are at least approximately arranged in the shape of concentric rings around a central sub-array in the center of the scanning zone. The transducer elements of each sub-array are jointly driven in the transmit mode with a selected time delay via a shared control line for the sub-array, and are jointly read out in a following receive mode via a shared signal line for the sub-array. By interconnecting the transducer elements in the scanning zone into concentric rings, an ultrasonic beam, which is propagated parallel to the surface normal of the matrix, and which is focused in two spatial directions, is produced.

The focusing range of the ultrasonic beam forms one pixel of the ultrasonic image. The scanning zone is now moved along the longitudinal axis of the rectangular transducer matrix. The transducer elements of the displaced scanning zone are interconnected to allow the same configuration of the concentric sub-array to be formed again with the same focusing properties. Thus, by longitudinally shifting the scanning zone across the matrix, the object is linearly scanned, whereby each pixel of the image corresponds to the part of the object situated in the focusing range of the particular scanning zone. In so doing, the ultrasonic beam is shifted along the longitudinal axis of the matrix and always remains parallel to the surface normals of the matrix and is adjusted to a fixed focusing spacing. In the case of this known system, the ultrasonic beam cannot be steered within a predetermined solid angle.

The object of the present invention is to provide a method and a device to ultrasonically image an object with a two-dimensional array, which will enable an ultrasonic beam to be produced that can be steered within a selected solid angle and, which, at the same time, will clearly reduce the number of different time delays required in the transmit mode and which will reduce the influence of parasitic capacitances on the received signals in the receive mode.

SUMMARY OF THE INVENTION

The present invention meets the above mentioned objective by providing a method and a device for imaging an object using a two-dimensional array of ultrasonic transducer elements.

The method includes steps of interconnecting groups of the transducer elements of the array for a transmit mode and a subsequent receive mode to form a predetermined configuration of sub-arrays, driving the transducer elements of each of the sub-arrays, in the transmit mode, with a same time delay, thereby transmitting an ultrasonic beam that can be directed at the object, reading out, in the receive mode, the electrical receiving signals of each sub-array which are generated by the ultrasound reflected by the object and received by the transducer elements of the corresponding sub-array, processing these electrical receiving signals of the sub-arrays to form an image of the object, and controlling the configurations of sub-arrays to produce an ultrasonic beam which can be steered within a predetermined solid angle. Configurations of sub-arrays in successive transmit modes and the corresponding receive modes essentially comprise, in each case, all the transducer elements of the array.

The device includes a two-dimensional array of transducer elements, a switch circuit, and a unit. The switch circuit interconnects, in a transmit mode and in a subsequent receive mode, the transducer elements of the array to form a predetermined configuration of sub-arrays and interconnects, in successive transmit modes and the corresponding receive modes, essentially all transducer elements of the array to form the respective configuration of the sub-array to allow the ultrasonic beam to be steered within a given solid angle. The unit drives the transducer elements of each sub-array in the transmit mode with the same time delay to produce an ultrasonic beam that can be directed towards the object, jointly reads out electrical receiving signals of each sub-array which are generated by the ultrasound reflected by the object and received by the transducer elements of the corresponding sub-array in the receive mode, and evaluates the electrical receiving signals from all sub-arrays to produce an image of the object. The unit is electrically connectable to the transducer elements of the array via the switch circuit.

The present invention is therefore based on the realization that to move an ultrasonic beam within a solid angle, in each case, sub-arrays formed by a group of transducer elements of the two-dimensional array can be driven with the same time delay. Such surfaces of the same time delay (phase surfaces) formed by the sub-arrays are produced when steering both focused, as well as unfocused or only partially focused, ultrasonic beams. In the present invention, the transducer elements of at least nearly the entire two-dimensional array are interconnected for each transmit mode and the subsequent receive mode to form a selected configuration of sub-arrays. The transducer elements of each sub-array are driven in the transmit mode with a specific time delay and are read out jointly in the receive mode. The configurations of the sub-arrays are controlled through successive transmit modes and the corresponding receive modes so as to move the ultrasonic beam within the selected solid angle. Given a predetermined distribution of the time delays in each configuration, the direction of the ultrasonic beam is adjusted with respect to a predetermined reference axis within the solid angle area by selecting the number of sub-arrays and the distribution of the sub-arrays over the entire array.

For a predetermined solid angle area for the ultrasonic beam, a maximum number of sub-arrays and corresponding control lines are required to drive the sub-arrays in the transmit mode. Corresponding signal lines are required to read out the sub-arrays in the receive mode. In each case, this maximum number is clearly less than the number of transducer elements. By combining a plurality of transducer elements, a de facto larger effective transducer element is obtained, and the parasitic capacitances of the signal lines, related to the total signal in the receive mode, are reduced. Furthermore, the number of time delays can be reduced. The beam characteristic of the two-dimensional array is virtually not degraded in comparison with a single wiring interconnection and single driving of each of the individual transducer elements because each configuration of the sub-arrays essentially comprises all transducer elements of the two-dimensional array and, consequently, the entire aperture of the array is utilized.

BRIEF DESCRIPTION OF THE DRAWINGS

The present invention will be clarified in greater detail in the following based on exemplary embodiments referred to in the drawings.

DETAILED DESCRIPTION

Corresponding parts are provided with the same reference symbols in the Figures.

Figure 1:
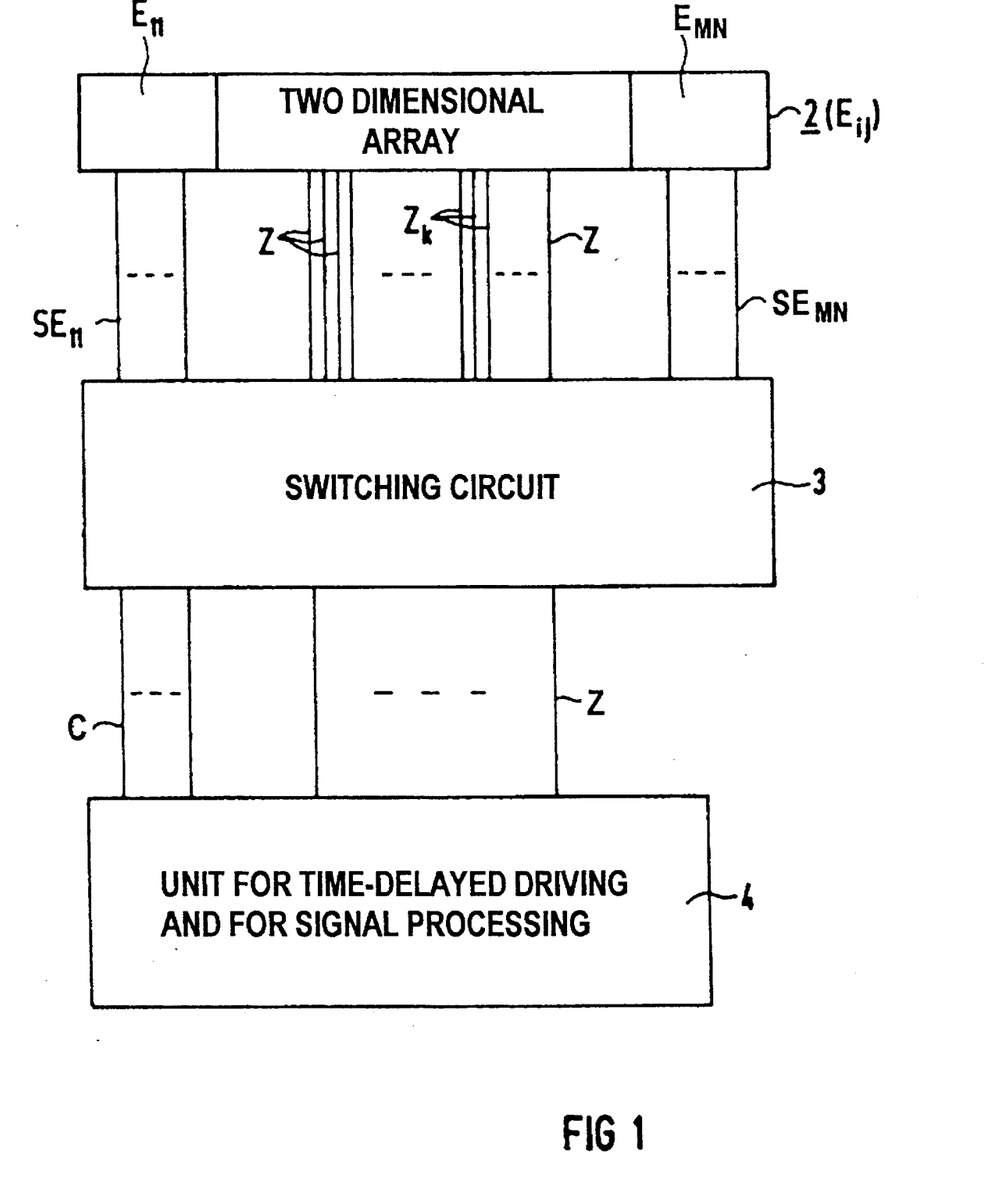
FIG. 1 is a block schematic illustrating the principal structure of a device for ultrasonically imaging an object.

In the structure according to FIG. 1, the ultrasonic-imaging device comprises a two-dimensional array 2 of transducer elements $E_{ij}$, a switching circuit 3, and a unit 4 for the time-delayed driving, in a transmit mode, of the transducer elements $E_{ij}$ for transmitting an ultrasonic beam which can be directed towards an object to be imaged, and for the signal processing, in a receive mode, of signals received by the transducer elements $E_{ij}$ and generated by the ultrasound reflected by the object. In this case, the index i of the transducer elements $E_{ij}$ runs from 1 through M, and the index j of the transducer elements $E_{ij}$ runs from 1 through N. Only the first transducer element $E_{11}$ and the last transducer element $E_{MN}$ of the two-dimensional array 2 are shown.

Each transducer element $E_{ij}$ is linked, via at least one and generally a plurality of interconnecting lines $SE_{ij}$, to the switching circuit 3. For driving and reading out its transducer elements $E_{ij}$, the array 2 (or switching circuit 3) can be linked, via a number Q of signal lines Z, to the unit 4. The switching circuit 3 is coupled with the signal lines Z between the two-dimensional array 2 and the unit 4. From the totality of signal lines Z, the switching circuit 3 can form a smaller number K <Q of signal lines $Z_k$ by combining signal lines Z. Accordingly, in operation, the two-dimensional array 2 is connected to the unit 4 via this smaller number of K signal lines.

With the interconnecting lines $SE_{ij}$, the switching circuit 3 can interconnect the transducer elements $E_{ij}$ to form at least one sub-array $G_k$ (not shown in FIG. 1). The number K of sub-arrays $G_k$ (with $1 \leq k \leq K$), the distribution of the sub-arrays over the entire two-dimensional array 2, and the number $L_k \geq 1$ of the transducer elements $E_{kl}$ of each sub-array $G_k$ (with $1 \leq l \leq L_k$), can be freely selected in view of a prescribed total number M·N of transducer elements $E_{ij}$ of the total two-dimensional array 2. In this case, each configuration of sub-arrays $G_k$ contains all transducer elements $E_{ij}$ of the two-dimensional array 2.

The individual sub-arrays $G_k$ are preferably designed to be contiguous (continuous, coherent), i.e., for each of their respective transducer elements $E_{kl}$, there is a directly adjacent transducer element $E_{kl+1}$, $E_{kl-1}$, $E_{k+1l}$, or $E_{k-1l}$ of the same sub-array $G_k$.

A specific configuration $G_1$ through $G_K$ of sub-arrays $G_k$ is now produced in the operation of the device for a transmit mode and for a subsequent receive mode. That is, the number K of the sub-arrays $G_k$, and their respective transducer elements $E_{kl}$, are established within the two-dimensional array 2.

In the transmit mode, each transducer element $E_{kl}$ of the sub-array $G_k$ is driven by the unit 4 via the signal lines $Z_k$ with the same time delay. Consequently, all transducer elements $E_{kl}$ of each sub-array $G_k$ are excited to oscillate at least approximately at the same time. Thus, in the transmit mode, a superposition (interference) of all ultrasonic waves of the individual transducer elements $E_{ij}$ produces an ultrasonic beam which can be steered towards an object to be imaged and preferably can also be focused.

The same configuration of sub-arrays $G_1$ through $G_K$ is also employed for the following receive mode, in which the ultrasonic waves reflected by the object and impinging upon the two-dimensional array 2 are detected by the transducer elements $E_{ij}$ and converted into electric receiving signals. The signals received from all transducer elements $E_{kl}$ of each sub-array $G_k$ are switched, in each case, to a signal line $Z_k$. The ratio of the effective transducer capacitance to the parasitic capacitance of the corresponding signal line $Z_k$ is much more favorable as a result of these measures. That is, the ratio of effective transducer capacitance to the parasitic capacitance of the signal line Z is larger than when each transducer element $E_{ij}$ is individually interconnected to a corresponding signal line. In this manner, the receiving sensitivity and the signal-to-noise ratio in the receive mode are clearly increased. The number of all the signal lines Z is at least as large as the number K of sub-arrays $G_k$ required during operation of the ultrasonic imaging device.

In the receive mode, the sub-arrays of each configuration are read out preferably with the same time delays as were used in the corresponding transmit mode.

The beam properties of the transmitted ultrasonic beam can be controlled by the number K and by the position of the sub-arrays $G_k$ within the two-dimensional array 2. Such beam properties include the alignment of the beam at desired steering angles with respect to a reference axis and the focusing of the beam at a point at a prescribed spacing distance from the two-dimensional array 2. The specific number of transducer elements $E_{ij}$ combined in the sub-arrays $G_k$ depends on a time quantization of the driving.

Figure 2:
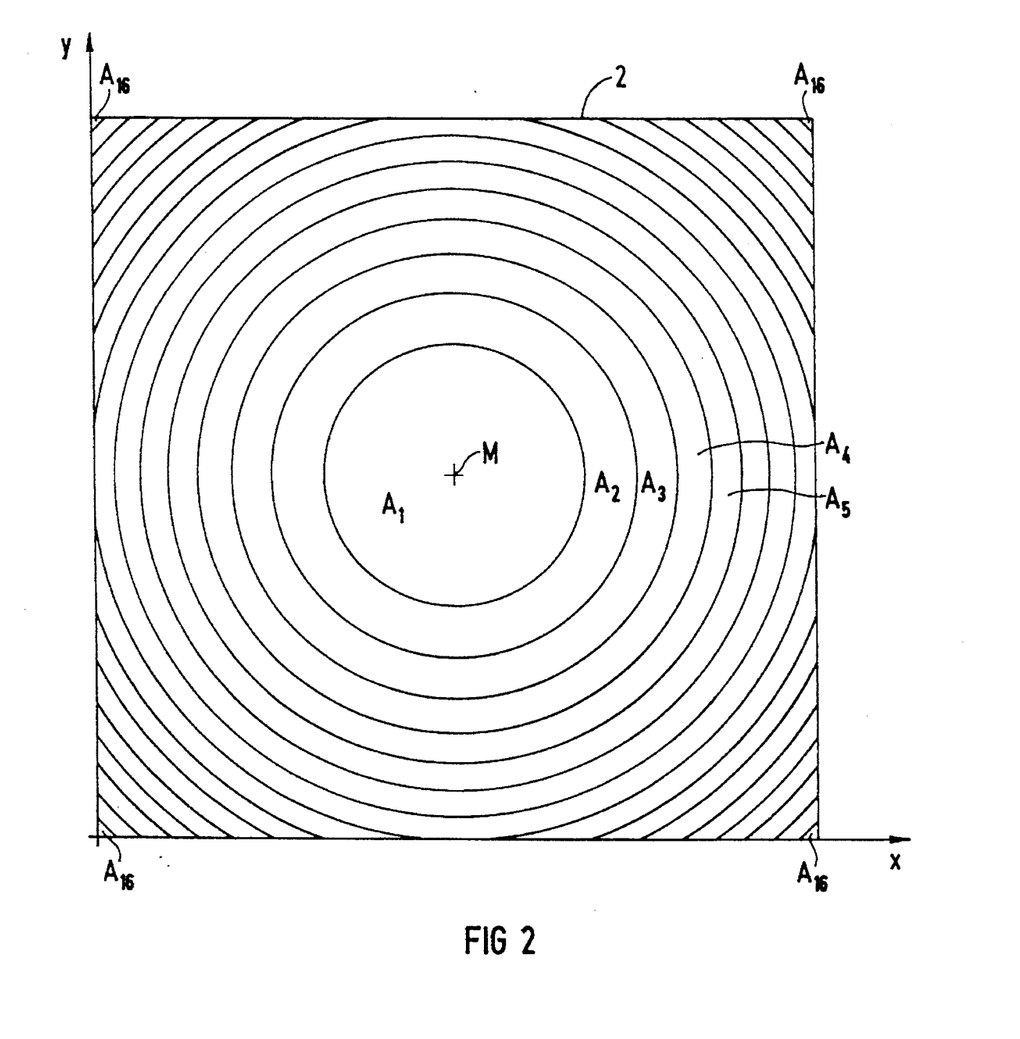
FIGS. 2 through 4 are plan views illustrating two-dimensional ultrasound arrays of the device of the present invention having interconnected sub-arrays which differ depending upon the direction of the emitted ultrasonic beam.
Figure 3:
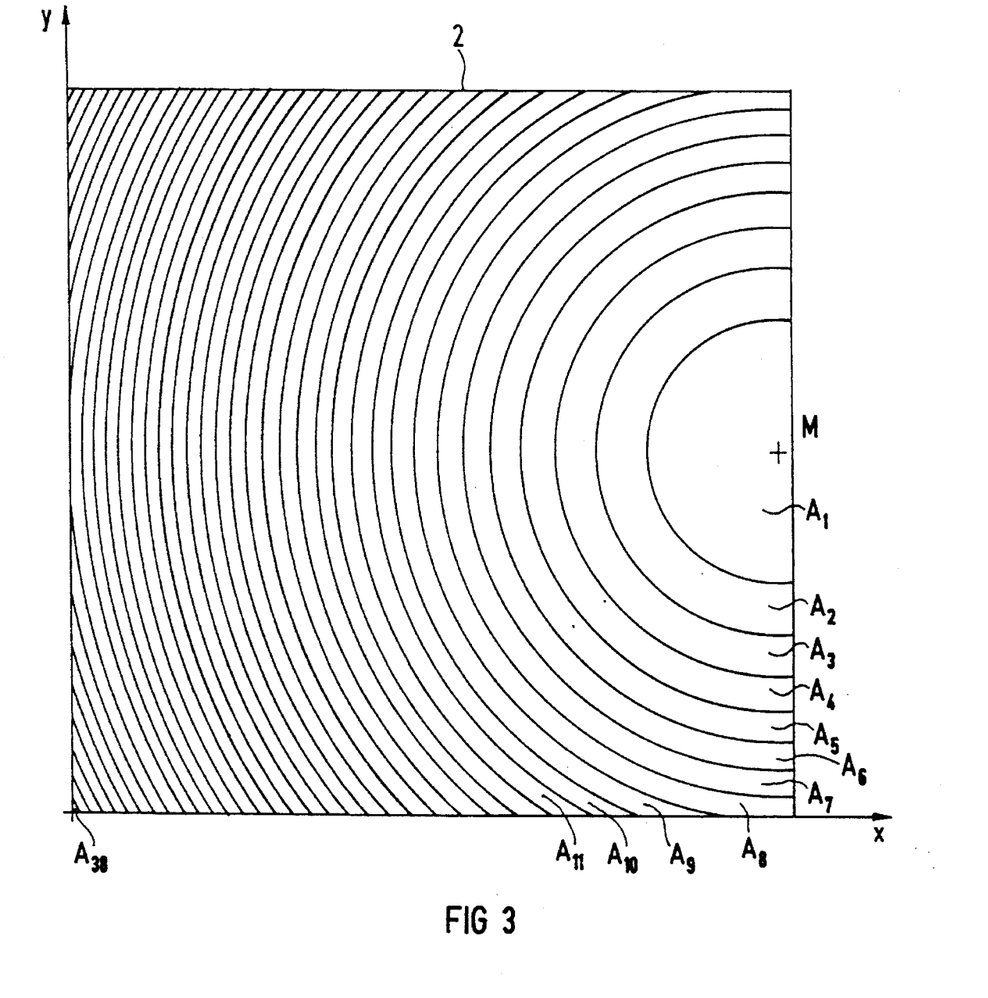
Figure 4:
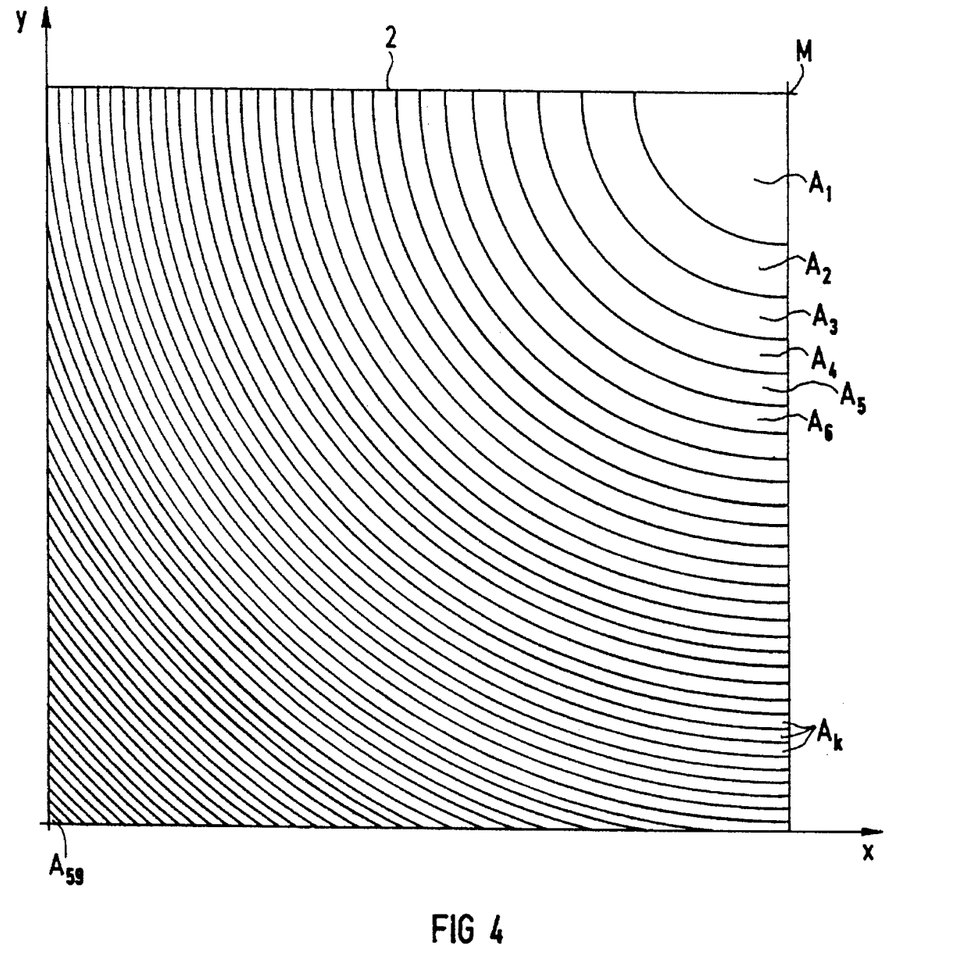

These relations shall be clarified again based on the exemplary embodiments according to FIGS. 2 through 4. For these exemplary embodiments, the surfaces $A_k$ of the same time delay (so-called phase surfaces) of the two-dimensional array 2, which in their sum produce an ultrasonic beam for various directions that is focused at a focal point with the spacing of 50 mm from the middle of the array, were determined arithmetically for a square two-dimensional array 2 comprising 64×64 transducer elements $E_{ij}$, a 220 μm grid pitch (i.e., a spacing of 220 μm between adjacent transducer elements $E_{ij}$), and 14 mm side length, given a predetermined time quantization of 40 ns. X denotes an axis running from a corner point of the two-dimensional array 2 along one of the side edges of the two-dimensional array 2, and Y denotes an axis running through the same corner point, perpendicular to the x-axis.

In the specific embodiment according to FIG. 2, the surfaces $A_k$ of the same time delay have been calculated for a central focal point situated on the normal to the array surface running through the midpoint of the array 2. The azimuth angle φ and the elevation angle θ are, thus, both 0°. The azimuth angle φ is defined as the angle between the surface normal to the array surface and the projection of the beam direction of the ultrasonic beam on to the plane fixed from the surface normal and the y-axis, and the elevation angle θ is defined as the angle between the surface normal and the projection of the beam direction on to the plane fixed from the surface normal and the y-axis.

A disk-shaped central surface $A_1$ was produced with the array midpoint at the midpoint M. Fifteen circular rings $A_2$ through $A_{16}$, which are situated concentrically around the surface $A_1$ and which directly adjoin one another, were also produced. The difference between the outer and inner radius of the circular-ring surfaces $A_k$ (i.e., the radial width of the circular-ring surfaces $A_k$) decreases from the middle M of the two-dimensional array 2 to the edge of the two-dimensional array 2. The edge of the array 2 forms the boundary of the circular rings.

In the exemplary embodiment according to FIG. 3, the focus of the ultrasonic beam is shifted toward the right edge of the two-dimensional array 2. This configuration of the phase surfaces $A_k$ produces an ultrasonic beam with an azimuth angle φ=7.5° and an elevation angle θ=0°. The central surface $A_1$ is now displaced together with the concentric circular rings $A_k$ with k≧2 toward the right edge of the two-dimensional array 2. The shared center point M of all surfaces $A_k$ is now situated almost on the edge of the two-dimensional array 2. The number of circular rings $A_2$ through $A_{38}$, whose radial widths become thinner from the center point M towards the edge, has now risen to 37.

In the specific embodiment according to FIG. 4, the shared center point M of the surfaces $A_k$ of the same time delay is situated on one corner of the two-dimensional array 2. The central surface $A_1$ has the shape of a quarter-circle disk. In this instance, 58 further circular rings $A_2$ through $A_{59}$ are defined around the surface $A_1$. This configuration of the phase surfaces $A_k$ produces an ultrasonic beam with an azimuth angle φ=7.5° and an elevation angle θ=7.5°.

If the focal spacing is enlarged and/or if the time quantization is more precise, then, in all specific embodiments, a central surface $A_1$ with a smaller radius and correspondingly more, and radially narrower, circular rings $A_k$ (with k>1) around this central surface $A_1$ result. Consequently, a better focusing, also in the area around the center point M results.

Analogous calculations for unfocused ultrasonic beams revealed linearly delimited, parallel surfaces of the same time delay. It is, of course, also possible to have mixed forms with partial focusing and more complicated surface patterns.

Starting from the observation that when the ultrasonic beam is steered within a solid angle, surface configurations having generally contiguous (coherent, continuous) surfaces always result, which are driven with the same time delay in the transmit mode, the transducer elements $E_{ij}$ of the two-dimensional array 2—not shown in FIGS. 2 through 4—are now interconnected to form sub-arrays $G_k$ to allow each sub-array $G_k$ to essentially reside within one surface $A_k$ of the same time delay. When fitting the sub-arrays $G_k$ into the surfaces $A_k$, disregarding individual transducer elements $E_{ij}$ can sometimes be advantageous. The number of these individual transducer elements $E_{ij}$ not considered (i.e., disregarded) in the corresponding configuration of the sub-arrays $G_k$ is generally negligible compared to the total number of transducer elements $E_{ij}$ of the two-dimensional array 2.

The surfaces $A_k$ of the same time delay can be predetermined for the desired steering angles θ and φ and, if desired, can also be determined for various focal spacings. The larger the number of transducer elements $E_{ij}$ and the finer the grid pitch (i.e., the spacing between adjacent transducers), the more precisely the sub-arrays $G_k$ can be fit into the surfaces $A_k$. The spacing of the transducer elements $E_{ij}$ depends, in this case, upon the wavelength of the emitted ultrasound and amounts, for example at 3.5 MHz, to about 200 μm. The dimensions of the transducer elements $E_{ij}$ depend ideally upon the desired solid angle for the ultrasound beam and amount at ±45° steering angle related to the surface normals in all directions to about 200×200 $μm^2$ for square transducer elements $E_{ij}$.

Figure 5:
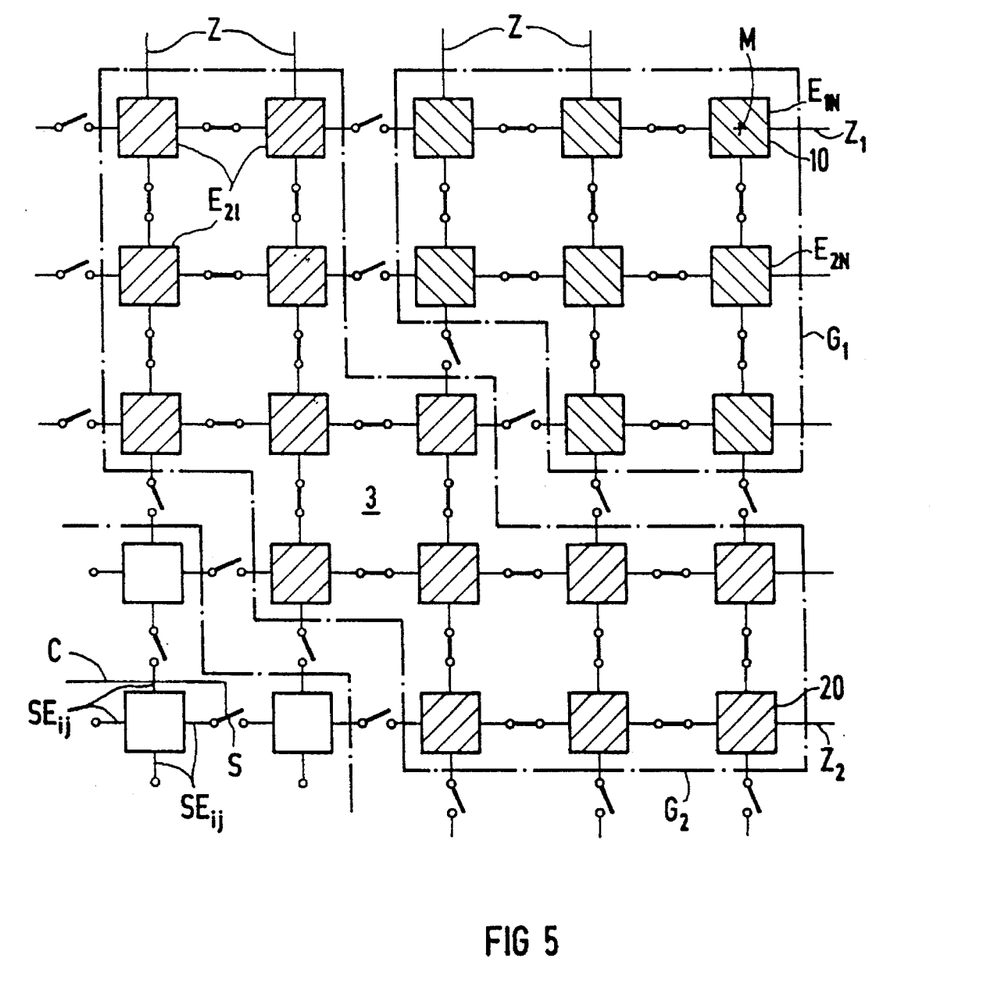
FIG. 5 is a schematic of a first embodiment of a switch circuit for interconnecting the transducer elements of the array.

FIG. 5 depicts one possible interconnection of the transducer elements $E_{ij}$ of the two-dimensional array 2 based on an edge cut-away portion of the ultrasonic array 2 of FIG. 4 in the area of the corner with the midpoint M of the phase surfaces $A_k$. The two-dimensional array 2 is designed as a matrix, in which the transducer elements $E_{ij}$ are arranged by rows and columns. In the rows and the columns of the matrix, one switch S is switched, in each case, between adjacent transducer elements $E_{ij}$ and $E_{ij+1}$ or $E_{ij}$ and $E_{i+1j}$. Thus, in the case of an N×N two-dimensional array 2, $2N^2-2N$ or 2N(N–1) switches S are necessary.

In a preferred embodiment, the switches S are integrated in a backing for the two-dimensional array 2, so that the switching circuit 3 and the two-dimensional array 2 form a basic (i.e., single integrated) unit. The switching lines $SE_{ij}$ between the transducer elements $E_{ij}$, and the switches S electrically connected to the switch lines $SE_{ij}$, are especially short and, consequently, have a relatively small capacitance. The switches S make up one part of the switching circuit 3.

The switches S can be triggered, via control lines C, to connect groups of the transducer elements $E_{ij}$ of the two-dimensional array 2 to form sub-arrays $G_K$. Although the number of these control lines C (namely $2N^2-2N$) is comparatively high, for switching purposes, these control lines C only need to transmit digital control signals which are comparatively robust with respect to dynamic response, frequency range, and signal-to-noise ratio. The switches S can be triggered based on the contents of a look-up table.

Only two sub-arrays $G_1$ and $G_2$ are shown in FIG. 5. The sub-array $G_1$ essentially corresponds to the surface $A_1$, and the sub-array $G_2$ essentially corresponds to the surface $A_2$ of the specific embodiment according to FIG. 4, the number of transducer elements $E_{kl}$ of each sub-array $G_k$ having been reduced for the sake of clarity in FIG. 5. Given a transfer of the edge segment of FIG. 4 that is to scale (that is, given the full number of transducer elements $E_{kl}$), the shape of the sub-array $G_k$ could be substantially better adapted to the shape of the ideal surfaces $A_k$.

Each sub-array $G_k$ is preferably driven, via an edge element of the two-dimensional array 2, in the transmit mode and similarly read out in the receive mode. To this end, the edge elements namely, $E_{11}$ through $E_{1N}$, $E_{21}$ through $E_{N1}$, $E_{N2}$ through $E_{NN}$ and $E_{2N}$ through $E_{N-1N}$ of the two-dimensional array 2 are each contacted by a signal line Z. In the depicted specific embodiment of FIG. 5, an edge element denoted by 10 is provided for the sub-array $G_1$ and an edge element denoted by 20 is provided for the sub-array $G_2$. In a 64×64 square two-dimensional array 2, out of a total of generally 4(N−1) of (252) signal lines, another part of the switching circuit 3 (not shown) selects merely K=59 (see FIG. 4) signal lines $Z_k$ for the time-delayed driving of all transducer elements $E_{ij}$ of the two-dimensional array 2. In the case of a specific embodiment according to FIG. 2 or FIG. 3 with a switching circuit 3 according to FIG. 5, the switching circuit 3 selects K=16 or 38, respectively, signal lines $Z_k$. Accordingly, in these instances, K is even smaller for a given time quantization and focusing.

At small steering angles θ and φ, central sub-arrays $G_K$ result which do not include edge transducers. For example, sub-arrays $G_1$ through $G_7$ in accordance with the surfaces $A_1$ through $A_7$, respectively in the exemplary embodiment according to FIG. 2, with θ=φ=0°, do not intercept the edge of the two-dimensional array 2. To drive these sub-arrays $G_1$ through $G_7$ from the edge of the two-dimensional array 2, a continuity of circuit, via transducer elements $E_{ij}$ not situated in the surface $A_k$, for example in one row or one column of the matrix, up to one edge element of the array 2 can be formed by switches S. Alternatively, the two-dimensional array 2 can be constructed from smaller arrays having contacted edge elements. For example, the square two-dimensional array 2 can be formed from four quadrants with respect to its center point. Each contiguous sub-array $G_k$ can then be composed of four parts, namely, one part in each of the respective quadrants.

Figure 6:
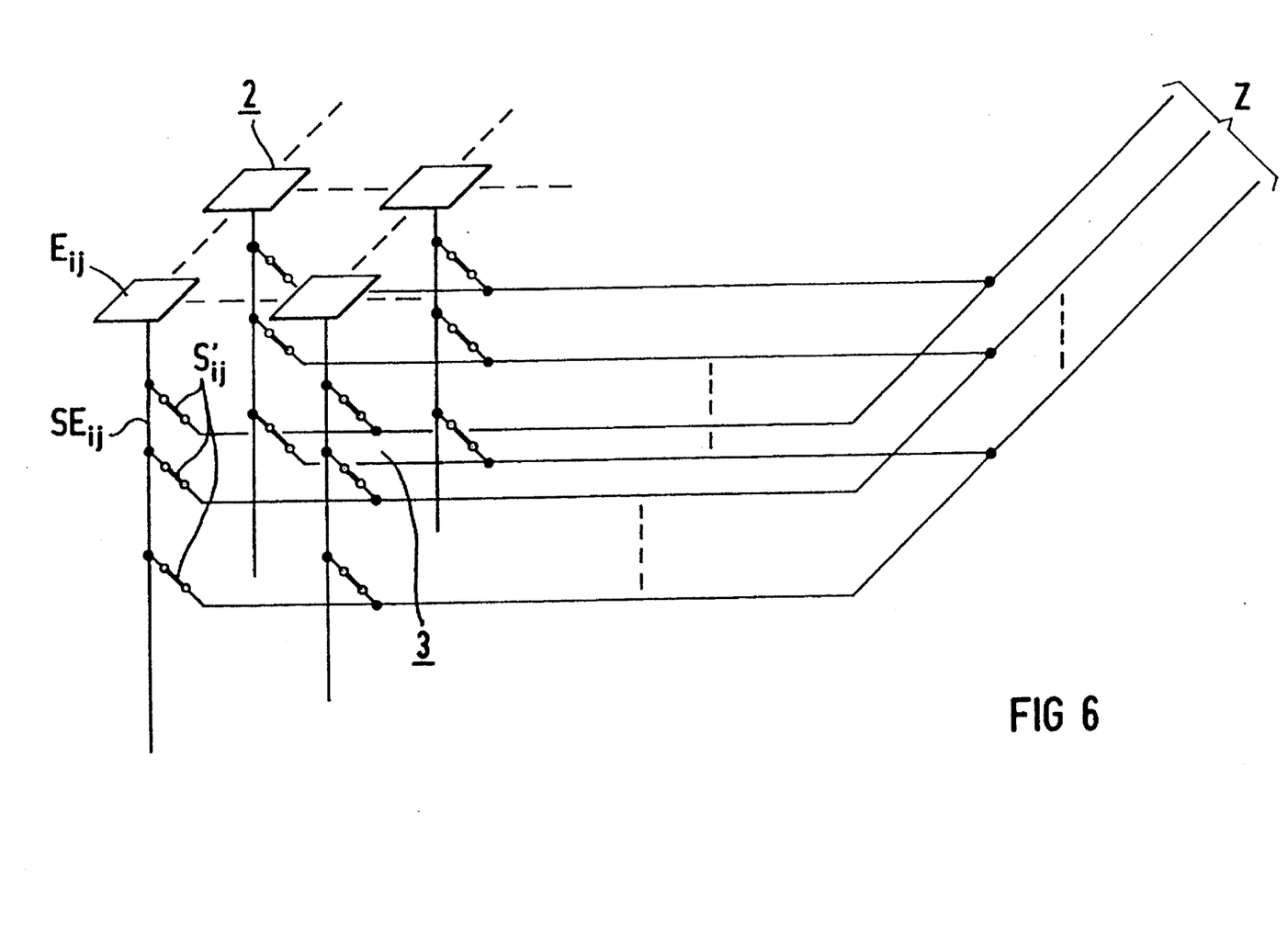
FIG. 6 is a schematic of a second embodiment of the switch circuit for interconnecting the transducer elements of the array.

Another embodiment of the device of the present invention is shown in FIG. 6. In this embodiment, for each transducer element $E_{ij}$ of the array 2, the switching circuit 3 comprises a number Q of individual switches $S'_{ij}$, by which each transducer element $E_{ij}$ can be connected with each of the Q signal lines Z between the switching circuit 3 and the unit 4 (not shown). To this end, the switches $S'_{ij}$ are each electrically connected to an interconnection line $SE_{ij}$, which is contacted in turn by the corresponding transducer element $E_{ij}$. In such a switching circuit, the total number of switches $S'_{ij}$ is equal to the number Q of the signal lines Z multiplied by the total number of transducer elements $E_{ij}$ of the array 2. Each switch $S'_{ij}$ can be triggered via a control line (not shown). A switching circuit 3 constructed in this manner is preferably integrated together with the unit 4 to form a basic (i.e., a single integrated) unit.

In all the specific embodiments, the switching circuit 3 can be structurally integrated both with the unit 4 as well as with the array 2. Moreover, the switching circuit 3 can also be used, for example, as a plug-in type switching module between the two-dimensional array 2 and a conventional ultrasonic unit having a smaller number of transmit and receive channels than unit 4, compared to the number of transducer elements $E_{ij}$ of the array 2.

The construction of the switching circuit 3 for interconnecting the sub-arrays $G_k$ is not restricted to the specific embodiments shown in the drawing.

What is claimed is:

1. A method for imaging an object using a two-dimensional array of ultrasonic transducer elements, the method comprising steps of:

a) selectively interconnecting transducer elements of the array to form one of a plurality of predetermined configurations of sub-arrays of interconnected transducer elements for a transmit mode and for a subsequent receive mode, wherein each configuration of sub-arrays includes a central sub-array and a number of substantially ring-shaped sub-arrays arranged concentrically about the central sub-array, wherein the number of ring-shaped sub-arrays is at least one;

b) in the transmit mode, driving the transducer elements of each of the sub-arrays with a same time delay to transmit an ultrasonic beam that can be directed at the object; and c) in the receive mode, reading out an electrical receiving signal of each sub-array, the electrical receiving signal of each sub-array being generated in response to reflections of the ultrasound beam which are received by the transducer elements of the respective sub-array;

d) processing the electrical receiving signals of the sub-arrays to form an image of the object; and e) steering the ultrasonic beam within a predetermined solid angle by successively selecting a different one of the configurations of sub-arrays in successive transmit modes so that the central sub-array is moved across the array surface in successive transmit modes, wherein the number of sub-arrays is increased as the central sub-array approaches an edge of the array;

wherein the configuration of sub-arrays in all of the successive transmit modes and in the corresponding receive modes includes substantially all of the transducer elements of the array.

2. The method according to claim 1, wherein radial widths of the ring-shaped sub-arrays decrease from the central sub-array outwardly in each configuration.

3. The method according to claim 1 further comprising the step of switching at least one transducer element of each sub-array to a corresponding signal line and transmitting the electrical receiving signal of each sub-array via the corresponding signal line.

4. The method according to claim 3, wherein all transducer elements of at least one of the sub-arrays are directly switched to the corresponding signal line.

5. The method according to claim 3 further comprising a step of selecting an edge element of the two-dimensional array as the transducer element which is switched to the signal line.

6. A device for imaging an object using ultrasound, the device comprising:

a) a two-dimensional array comprising a plurality of ultrasonic transducer elements;

b) a switch circuit for selectively interconnecting, in a transmit mode and in a subsequent receive mode, the transducer elements of the array to form one of a plurality of predetermined configurations of sub-arrays of interconnected transducer elements, each configuration of sub-arrays including substantially all of the transducer elements of the array and including a central sub-array and a number of substantially ring-shaped sub-arrays arranged concentrically with respect to the central sub-array, wherein the number of ring-shaped sub-arrays is at least one; and c) a unit coupled to the two-dimensional array for:

i) driving the transducer elements of each sub-array in the transmit mode with the same time delay to produce an ultrasonic beam that can be directed towards the object, ii) jointly reading out the transducer elements of each sub-array in the receive mode, thereby obtaining an electrical receiving signal from each sub-array, and iii) evaluating the electrical receiving signals from all sub-arrays for producing an image of the object, the unit being electrically connectable to the transducer elements of the array via the switch circuit, wherein, in order to steer the ultrasonic beam within a predetermined solid angle, the switch circuit, in successive transmit modes, forms successive configurations of sub-arrays so that the central sub-array is moved across the array surface in successive transmit modes, wherein the number of sub-arrays is increased as the central sub-array approaches the edge of the array.

7. The device according to claim 6, wherein the switch circuit includes switches arranged between the transducer elements of the array.

8. The device according to claim 6 further comprising:

signal lines electrically connecting the switch circuit and the unit; and connected switches arranged in the switch circuit between the transducer elements of the array and the signal lines.

9. The device of claim 6, wherein the switch circuit and the array are integrated together.

10. The device of claim 6, wherein the switch circuit and the unit are integrated together.

11. The device of claim 6, wherein the radial widths of the ring-shaped sub-arrays decrease from the central sub-array outwardly in each configuration.

* * * * *